Nov. 3, 1964    JEAN-PAUL VUILLEUMIER ETAL    3,154,951
MOVIE CAMERA RELEASING AND TIMING DEVICE
Filed June 19, 1961    3 Sheets-Sheet 1

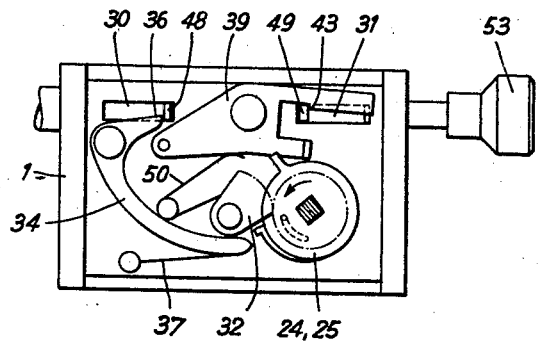
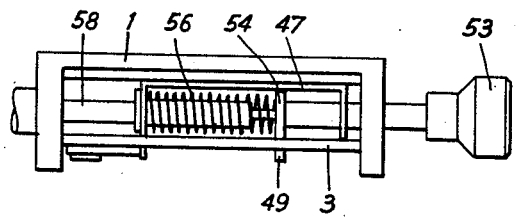
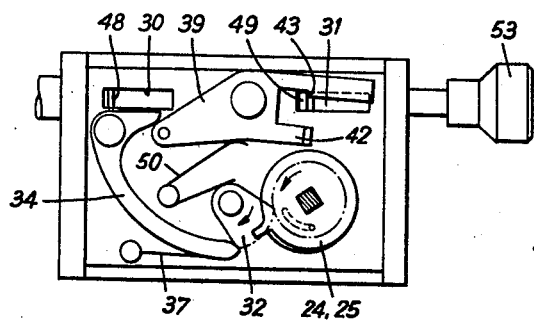
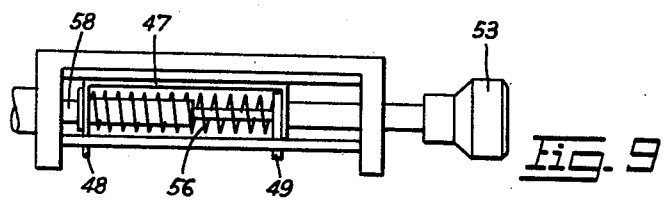

United States Patent Office 3,154,951
Patented Nov. 3, 1964

3,154,951
MOVIE CAMERA RELEASING AND TIMING DEVICE
Jean-Paul Vuilleumier and Pierre-Frédéric Pfister, both of Sonceboz, Bern, Switzerland, assignors to Societe Industrielle de Sonceboz, Sonceboz, Switzerland, a joint-stock company
Filed June 19, 1961, Ser. No. 117,963
Claims priority, application Switzerland, June 17, 1960, 6,971/60
6 Claims. (Cl. 74—3.54)

This invention relates to movie camera releasing and timing devices.

Releasing and timing devices have already been combined with movie cameras to enable the operator to be included in the picture to be taken by the camera. With the devices known in the art a first control member enables setting a pre-picture interval of selected length during which the operator can go to the chosen place before the camera. A second control member enables setting the running time of the movie camera at will. Said known devices are enclosed in a common casing forming a single unit which can at will be attached to the camera or removed therefrom.

These releasing and timing devices have, however, the drawback that the movie camera to which such a device is fixed cannot be used manually unless said device is first removed from the camera. The known devices have also the drawback that to set the running time of the camera the corresponding indicator has to be put on a time indicating division corresponding to the sum of the pre-picture interval and the running time and not on that corresponding to the running time alone. Said known devices have moreover the drawback that the clockwork mechanism starts running as soon as said indicator is released.

It is therefore an object of this invention to provide an improved movie camera releasing and timing device enabling both an automatic and a manual operation of the camera without having to remove the device from the camera.

Another object of the invention is to provide an improved device of the type indicated above which enables actuating the camera switch with the same pusher both when the camera is operated manually and automatically.

Still another object of the invention is to provide an improved releasing and timing device which necessitates only one setting operation when the camera is to take a picture automatically, a constant pre-picture interval thereby being automatically set upon actuation of the setting member carrying out said setting operation.

A further object of the invention is to provide a device ensuring a quick actuation of the camera switch both at the beginning and at the end of the picture.

Still further objects of the invention will become apparent in the course of the following description.

One embodiment and a modification of the device according to the invention are represented diagrammatically and by way of example in the accompanying drawings.

In the drawings:

FIG. 6 is an elevational view similar to that of FIG. 5, showing still another operating position;

FIG. 7 is a top view of FIG. 6;

FIG. 8 is an elevational view similar to those of FIGS. 5 and 6, showing still another operating position;

FIG. 9 is a top view of FIG. 8; and

Figure 1:
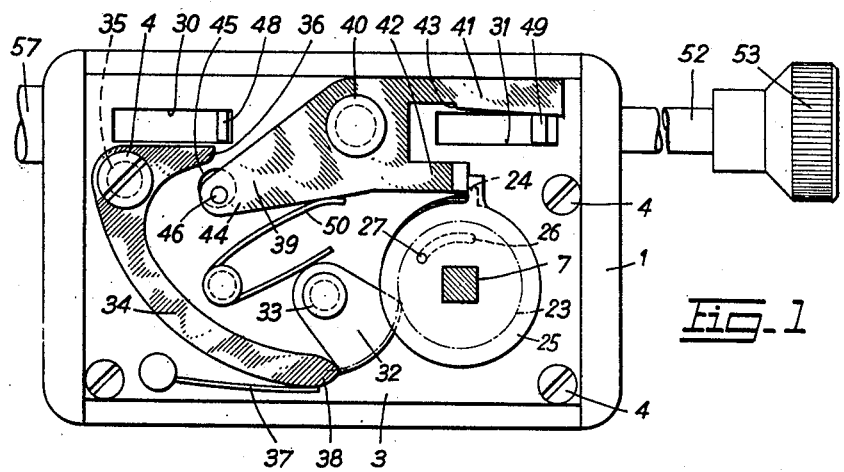
FIG. 1 is an elevational view of said embodiment partly in section along line I—I of FIG. 2.

The releasing and timing device represented in the drawings forms a unit which can easily be attached to and removed from a movie camera by screwing the same on to or unscrewing it from an appropriate portion of the camera at the place thereof, where the starting switch is provided. This releasing and timing device is enclosed in a casing 1 and the different parts thereof are mounted on two plates 2 and 3 fixed to casing 1 by means of spacing screws 4.

Figure 3:
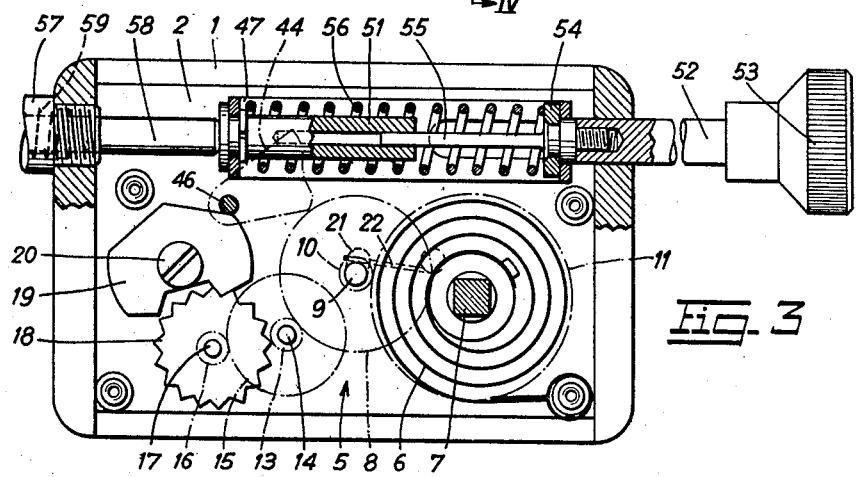
FIG. 3 is a sectional view of the device of FIG. 2 along line III—III thereof.

While referring now more particularly to FIG. 3, the releasing and timing device first comprises a clockwork mechanism generally designated by 5. This mechanism is arranged between the plates 2 and 3. It is driven by a power spring 6 having its inner end secured to a hook provided on a bearing surface 12 of shaft 7 and its outer end anchored by means of spacing screws 4 of the frame work of the device as usual in the art. A wheel 11 is secured on to shaft 7 and meshes with a first intermediate step down gear comprising a toothed wheel 8 and a pinion 10 mounted on axle 9. Pinion 10 is in meshing relation with wheel 11 while wheel 8 drives a second intermediate step-down gear comprising a pinion 13 and a wheel 15, mounted on an axle 14. Wheel 15 is in meshing relation with a pinion 16 on an axle 17 which carries an escape wheel 18.

The escape wheel 18 cooperates with a lever 19 pivotally mounted on a stud-screw 20. The axle 9 of the first intermediate step-down gear is journalled within two arcuate slots 21 provided in the plates 2 and 3 parallel to shaft 7, so that said first intermediate gear can move around shaft 7 and wheel 11 through such a distance that wheel 8 leaves pinion 13 of the second intermediate gear. The first intermediate gear (8, 10) is however held normally in the position represented in FIG. 3 by means of a leaf spring 22.

Figure 2:
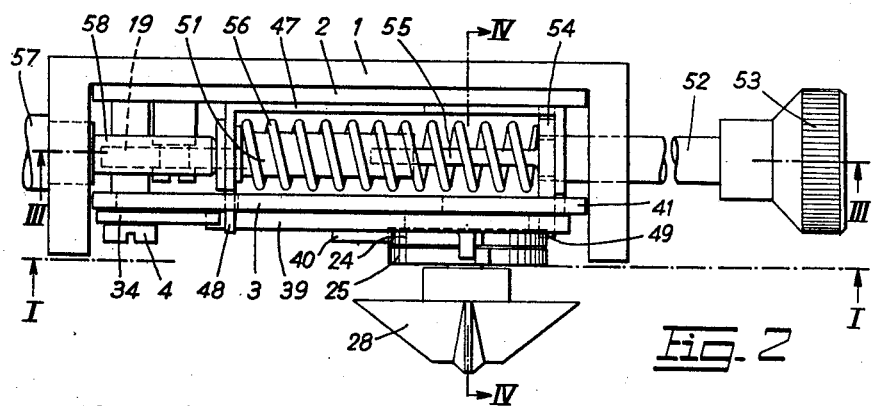
FIG. 2 is a top view of the device of FIG. 1, the upper wall of the casing being removed.
Figure 4:
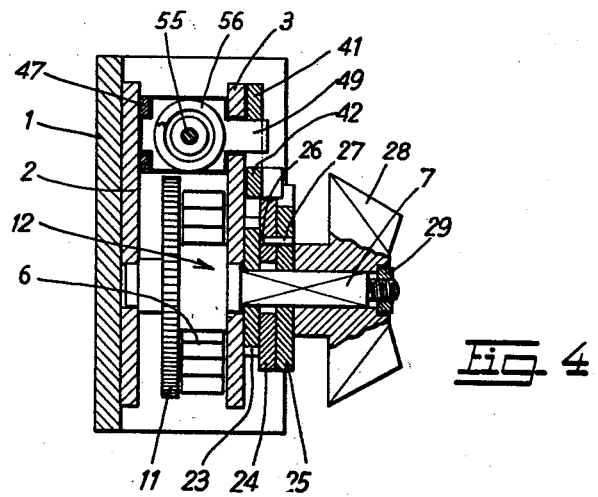
FIG. 4 is a cross-section of FIG. 2 along line IV—IV thereof.

The releasing and timing device according to the invention further comprises a timed releasing mechanism more particularly shown in FIGS. 1, 2 and 4. This releasing mechanism first comprises a gear 23 mounted on to a square portion of shaft 7 and consequently fixed thereto for rotary motion. This gear 23 cooperates with a control member on toothed sector 32 to actuate a releasing crank-lever 34 set under the action of a leaf spring 37. The toothed sector 32 is pivotally mounted on a stud screw 33 and it is arranged so that it can come into meshing relation with the toothed wheel 23 on shaft 7. The crank-lever 34 is pivotally mounted on a stud-screw 35 and it comprises a first arm 36 extending along the lower edge of a slot 30 of plate 3 and a second arm the end 38 of which is pressed against the toothed sector 32 by means of leaf spring 37.

The device according to the invention also comprises a timing mechanism to control the running time of the movie camera. This timing mechanism comprises a control member or cam 24 idly mounted on the square portion of shaft 7 and a disc 25 fixed for rotary motion to said shaft. Cam 24 and disc 25 are coupled with one another by means of an arcuate slot 26 provided in cam 24 coaxially to shaft 7 and a pin 27 fixed to disc 25 and extending within slot 26.

The timing and the releasing mechanisms are set simultaneously upon actuation of a single winding and setting button 28 fixed on the end portion of shaft 7 by means of a nut 29.

The front plate 3 is provided with two elongated slots 30, 31 to permit the establishment of a connection between the releasing and the timing devices, on the one hand, and a releasing pusher on the other hand.

The timing mechanism further comprises a locking lever 39 formed with two parallel arms 41 and 42. This locking lever is pivotally mounted around stud 40 so that arm 41 is substantially parallel to the upper edge of slot 31 when said locking lever is inoperative. A notch 43 is provided at the root of arm 41 on the edge thereof adjacent to slot 31. Lever 39 is further provided with a projection 44 carrying a pin 46 extending across an opening 45 of the front plate 3 so that pin 46 cooperates with the escapement lever 19 of the clockwork mechanism. Lever 39 is set under the action of a leaf spring 50 which is urging said lever clockwise around stud 40 in FIG. 1.

Referring now more particularly to FIGS. 2 and 3, the releasing pusher comprises a control section and an actuating section which are telescopically mounted on one another so that one section can be shifted lengthwise with respect to the other section. Resilient means constituted by a relatively strong coil spring 56 are inserted between the two sections of the releasing pusher so as to maintain said sections in a predeterminate axial position with respect to one another, said sections thus forming normally a single unit shiftably mounted in appropriate openings provided in the side walls of housing 1. The actuating section of the releasing pusher comprises a U-shaped bracket 47. The left end portion of this bracket is formed with a releasing nose 48 extending across slot 30. At its left end bracket 47 carries a guiding sleeve 51. The control section of the releasing pusher comprises a rod 52 shiftably arranged both in an opening provided in the right end portion of bracket 47 and in the right side wall of housing 1. A control button 53 is fixed at the end of rod 52 projecting from housing 1. The rod 52 is screwed onto the tapped end portion of a smaller rod 55 slidably arranged within the guiding sleeve 51. The coil spring 56 is set between the left end portion of bracket 47 and a plate 54 fixed to a larger head portion of rod 55. The plate 54 is formed with a nose 49 projecting across slot 31.

The left side wall of casing 1 is provided with an opening to enable the end portion 58 of a Bowden wire connected to the actuating switch of the camera (not shown) entering the casing 1. The wire end portion 58 is set under the action of a spring 57 weaker than spring 56.

The releasing and timing device described operates as follows: When this device is at rest, its different parts are in the position represented in FIG. 1 in which the camera switch can be actuated manually, as in the usual manner by merely pressing button 53. Since the device according to the invention is fixed to the movie camera in the vicinity of the actuating switch thereof, it will be observed that operating the camera by means of button 53 can be ensured substantially in the same manner as if the device according to the invention were removed from the camera. Since spring 56 is stronger than spring 57, a pressure exerted on button 53 will indeed be transmitted to the wire portion 58 as if both sections of the releasing pusher were rigidly connected to one another.

To operate the camera automatically with the device according to the invention, the clockwork need only be wound up and set by rotating button 28 clockwise through a predetermined angle. During the rotary motion of button 28 the wheel 11 also rotates thus causing wheel 8 to jump over the teeth of pinion 13, the axle 9 of wheel 8 thereby oscillating within slots 21 against the action of spring 22. After button 28 has been rotated the main spring 6 of the clockwork is wound up, but the potential energy stored therein cannot be dissipated immediately through the clockwork mechanism, since the escapement lever 19 thereof is locked by pin 46 of the locking lever.

During said rotary motion of shaft 7, wheel 23 drives the toothed sector 32 counterclockwise and the releasing lever 34 rocks counterclockwise through the action of spring 37. As soon as the releasing lever 34 starts rocking counterclockwise, its arm 36 moves beyond the lower edge of slot 30. The locking lever 39 keeps however the clockwork at rest, since this lever is held in locking position by means of nose 49 against which arm 41 of lever 39 is abutting under the action of spring 50.

Figure 5:
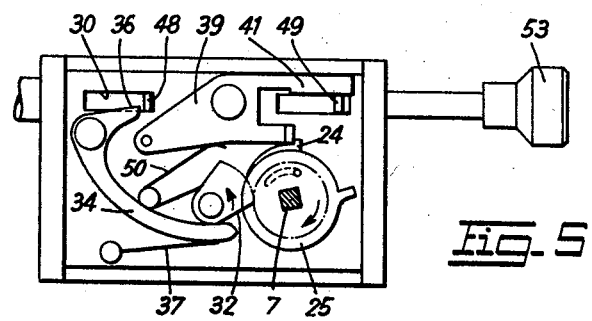
FIG. 5 is a view similar to that of FIG. 1 on a somewhat reduced scale showing the device in another operating position.

When button 28 is rotated clockwise as stated above, disc 25 first rotates alone while cam 24 remains in the position of FIG. 1. Disc 25 will then reach the position represented in FIG. 5, in which the pin 27 fixed to this disc has reached the end of slot 26. As shown in FIG. 5, the cam 24 prevents the locking lever 39 from rocking clockwise to such an extent that nose 49 would be caught by notch 43, if a pressure were exerted on button 53 in the position of FIG. 5.

After the rotary motion of shaft 7 illustrated in FIG. 5 the releasing lever is in operative position. Its arm 36 thus prevents nose 48 of the actuating section of the releasing pusher from moving toward the left, said actuating section thereby actuating the camera switch. In other words, if button 53 is inadvertently pressed toward the left as shown in FIG. 5, it will come back as soon as it will be released and the camera will not be switched on.

It appears from this description that the releasing lever 34 is immediately brought into operative position as soon as the winding and setting button 28 is actuated. It will also be observed that the camera switch cannot be actuated when button 28 has only been driven through an angle smaller than that along which slot 26 is extending. The length of slot 26 thus determines the pre-picture interval, which will be set every time a running time of the camera will itself be adjusted.

In contradistinction to the known devices, the device according to the invention thus always operates with the same pre-picture interval. This does, however, not involve any drawback. It has indeed been observed that a unitary pre-picture interval can without any difficulty be chosen so that the operator will in any case have ample time at disposal to reach his place in the picture before the camera will be switched on. In most of the cases a pre-picture interval of 10 seconds can be considered as amply sufficient.

To set now a predetermined running time of the camera, the button 28 must be driven clockwise from the position represented in FIG. 5 toward that represented in FIG. 6. During this supplementary motion of button 28 the disc 25 drives cam 24 clockwise by means of its pin 27 until button 28 has reached the desired position. To permit setting the running time with precision a scale of indicia can advantageously be provided on the front wall of casing 1 and button 28 with a pointer. The zero of this scale will obviously have to correspond to the position of button 28 represented in FIG. 5.

In the position of FIG. 6 the button 28 has been driven clockwise almost as much as possible so that the position shown in this FIGURE corresponds to the longest possible running period of the movie camera which can be set by means of the releasing and timing device described.

Once the button 28 has been set in the desired position, the device is ready for automatically operating the camera during a predetermined time period. To start the operation of the camera the releasing pusher button 53 needs only be pushed until nose 49 of its control section is caught by notch 43 of the locking lever 39, as shown in FIG. 6. It will still be observed in FIGURE 6 that when button 53 has been pressed inward so far that nose 49 comes opposite notch 43, the locking lever 39 rocks under the action of spring 50, thus causing the clockwork to start running because pin 46 disengages the escapement lever 19.

In the position represented in FIG. 6 the actuating section of the releasing pusher can, however, not move toward the left and actuate the camera switch, because arm 36 of the releasing lever 34 is still keeping nose 48 of said actuating section. The spring 56 thus momentarily remains in pressed condition as shown in FIG. 7 between the left end portion of bracket 47 and plate 54.

When the clockwork starts running, the shaft 7 is rotating slowly in the direction of the arrows represented in FIGS. 6 and 8. During this rotary motion of shaft 7 the wheel 23 first drives the toothed sector 32 clockwise, as shown in FIG. 8, thus permitting lever 34 to rock slowly also in clockwise direction in FIG. 8. Arm 36 of lever 34 will accordingly leave nose 48 of the actuating section of the releasing pusher. As soon as nose 48 is freed by arm 36, spring 56 very quickly urges the actuating section of the releasing pusher toward the left against the action of spring 57, because the latter is substantially weaker than spring 56, as already stated above.

At the moment at which the releasing lever leaves the actuating section of the releasing pusher, the pin 27 of disc 25 has reached the other end of slot 26 of cam 24 as shown in FIG. 8. The actuating section of said releasing pusher remains then in the axial position shown in FIG. 8 under the action of spring 56 and of notch 43 which is keeping nose 49 of the control section of said releasing pusher caught in pressed position.

After the running time of the camera set by the initial rotation of button 28 has elapsed, cam 24 has slowly come back to the position represented in FIG. 1. During that motion of cam 24 the camming surface thereof progressively lifts the arm 42 of the locking lever 39 and causes the latter to rock counterclockwise around stud 40 against the action of spring 50, until notch 43 releases nose 49. At that moment the spring 57 urges both sections of the releasing pusher together toward the right, nose 49 thereby sliding along the inclined lower edge of arm 41 and causing pin 46 of lever 39 to lock the clockwork mechanism. The shifting motion of the releasing pusher occurring after nose 49 has been released by notch 43 permits the camera switch to stop the operation of the camera.

The disc 25 and the cam 24 are each provided with a radially and outwardly projecting nose, said noses cooperating with the end surface of arm 42 of the locking lever 39 to avoid any further counterclockwise rotation of shaft 7 in the position represented in FIG. 1.

With the releasing and timing device described the movie camera will be running automatically during a period corresponding to the time set by the original rotation of button 28. To enable the operator stopping the operation of the camera before the automatic running time set has elapsed, the embodiment described could be modified, e.g. by providing the locking lever 39 with an arm 41 extending outside the casing 1 thus permitting a manual actuation of the locking lever to release nose 49 at any desired moment.

Figure 10:
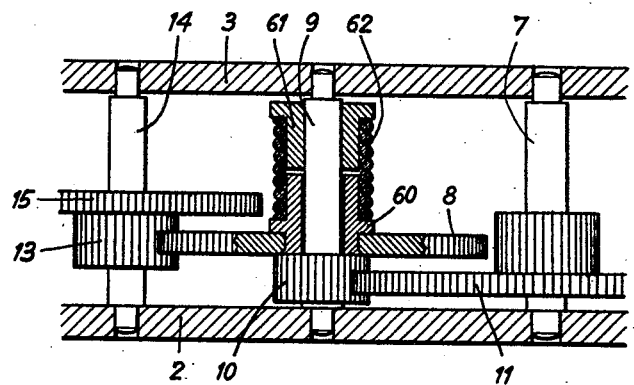
FIG. 10 is a part-sectional view showing said modification.

A further modification of the embodiment described above is shown in FIG. 10 of the drawings. This modification is concerned with the first intermediate step-down gear of the clockwork mechanism. Instead of a gear having an axle 9 mounted for oscillating motion within arcuate slots 21, this gear can also be provided with an axle journalled in fixed bearings. To permit the winding operation or shaft 7, the gear represented in FIG. 10 comprises a first sleeve member 60 carrying wheel 8 and idly mounted on a bearing portion of axle 9. A second sleeve member 61 is fixed to said axle and both sleeves are coupled with one another in a manner well known in the art by means of a coil spring 62 frictionally engaging the outer cylindrical surfaces of sleeves 60 and 61 which are adjacent to one another.

It appears that the device previously described can only be brought back to its resting position shown in FIG. 1, once the control member 28 has been rotated clockwise, by pressing member 53 and accordingly leaving the clockwork mechanism to run down. Should now the camera operator have set the automatic running time by a rotation of button 28 and then change his mind and be desirous to operate his camera manually, he only need to remove the device according to the invention from the camera and to leave it run down alone by pressing member 53 into the position represented in FIG. 6.

Although one embodiment and some modifications have been described in detail hereabove, various changes in the shape, sizes and arrangement of parts will appear obvious to those skilled in the art within the scope of appended claims.

We claim:

1. In a camera releasing and timing device, in combination, a releasing pusher means movable from an inoperative position to an operative position and including a control portion and actuating portion movable with respect to each other, releasing means movable from a releasing position to a holding position, first urging means urging said releasing means to its holding position, said releasing means engaging said actuating portion of said releasing pusher means to maintain said actuating portion inoperative when said releasing means is in its its holding position, first locking means movable from an unlocking to a locking position, said first locking means engaging said control portion of said releasing pusher means to maintain said control portion in said operative position when said first locking means is in said locking position, second locking means operatively connected with said first locking means and movable from an unlocking position to a locking position, second urging means urging said first locking means to said locking position and urging said second locking means to said unlocking position, timing means operatively connected to said second locking means, said timing means being maintained inoperative by said second locking means engaging same when said second locking means is in said locking position, setting means movable from a rest position to different control positions, said setting means being operatively connected to said timing means and including a first control member operatively connected to said releasing means to permit same to move into its holding position under the action of said first urging means when said setting means are set and to move said releasing means from its holding position to its releasing position when said timing means has run a predetermined time, and a second control member operatively connected to said setting means and to said first locking means for moving said first locking means from said locking position to said unlocking position when said timing means has run said predetermined time and for permitting said first locking means to move from said unlocking position to said locking position when said setting means have been set in one of said different control positions, said control portion of said releasing pusher means being operatively connected to both said first and second locking means to permit said first locking means to move into said locking position when said setting means have been set in one of said different control positions and said control portion is moved into its operative position and to cause said second locking means to move into said locking position when said control portion is moved from its operative to its inoperative position and to permit said second locking means to move into said unlocking position when said control portion is moved into its operative position after said setting means have been moved into one of said different control positions.

2. A camera releasing and timing device comprisnig a casing, timing means mounted in said casing, setting means operatively connected to said timing means to set said timing means from a position of rest to different control positions, releasing plunger means including an actuating section and a control section movable one with respect to the other, first locking means mounted on said casing and engageable with said control section to lock said control section in an operative position, second locking means operatively connected with said first locking means and with said timing means and mounted on said casing for locking said timing means in said position of rest, said first and second locking means being operatively connected with said setting means whereby said first locking means permits movement of said control section to an inoperative position and said second locking means locks said timing means in said position of rest, when said setting means is set at said rest position, lever means mounted on said casing having a first portion for engaging said actuating section to maintain same in said inoperative position when said control section is locked in said operative position by said first locking means and a second portion operatively connected to said first portion and to said setting means to move said first portion into and out of engagement with said actuating section upon movement of said setting means from said rest position to one of said different control positions.

3. A camera releasing and timing device according to claim 2 in which said setting means includes a shaft, a cam loosely mounted on said shaft, a disc fixedly connected to said shaft, said cam having an arcuate slot therein, and a pin connected to said disc and disposed in said slot so that when said disc rotates along with said shaft said cam is carried therewith.

4. A camera releasing and timing device according to claim 2 in which said first locking means includes a lever member pivotally mounted on said casing having a notch disposed therein and in which a nose of said control section becomes engaged upon said control section being moved from its normal inoperative position to the locking position of said first locking means.

5. A camera releasing and timing device according to claim 2 in which said second locking means includes a pin disposed on a lever member pivotally mounted to said casing, said pin engaging an escapement lever of said timing means when said second locking means is in its locking position.

6. A camera releasing and timing device according to claim 2 in which said setting means includes a shaft, a toothed wheel fixedly mounted thereon, a toothed sector pivotally mounted to said casing and meshing with said toothed wheel and drivable by same when said setting means is moved, said toothed sector engaging said second portion of said lever means to move same in accordance to the movement of said setting means.

References Cited in the file of this patent

UNITED STATES PATENTS

| | | |
|---|---|---|
| 1,524,187 | Lowen | Jan. 27, 1925 |
| 2,478,394 | Harvey | Aug. 9, 1949 |
| 2,664,755 | Kiel | Jan. 5, 1954 |
| 2,689,006 | Lindsay | Sept. 14, 1954 |
| 2,938,445 | Strutynski | May 31, 1960 |
| 2,974,575 | Senger | Mar. 14, 1961 |
| 3,008,395 | Ieda et al. | Nov. 14, 1961 |

FOREIGN PATENTS

| | | |
|---|---|---|
| 954,030 | France | Dec. 16, 1949 |